FIG. 1

April 5, 1966   G. H. JONES   3,244,864
SUBTRACTION UNIT FOR A DIGITAL COMPUTER
Filed Dec. 10, 1962   8 Sheets-Sheet 4

J REG. CONTROL CIRCUIT-84a (FIG.3.)

(1) SET J=0 = J6
(2) SET J=2 = J0
(3) SET J=3 = J2·($E_a = E_b$)
(4) SET J=4 = J3·I SUB
(5) SET J=5 = J3·I ADD
(6) SET J=6 = J4·Q04F' + J5·Q03F'

FIG_4

FIG_4A

GATE CONTROL FOR MANTISSA CONTROL CIRCUIT-14 (FIG.1.)

(1) SHIFT A L. = J2·($E_a > E_b$)·(B≠0)·(A13=0)
(2) SHIFT A R. = J2·($E_b > E_a$)·(A≠0)·(B13≠0)
(3) A→0 = J3+J6
(4) A1→0 = J2·($E_a > E_b$)·(B≠0)·(A13=0)
(5) A13→0 = J2·($E_b > E_a$)·(A≠0)·(B13≠0)

FIG_5

GATE CONTROL FOR COMPL. CONTROL CIRCUIT-15 (FIG.1.)

COMPL. A = J2·($E_a = E_b$)·SUB·(B>A)

FIG_6

GATE CONTROL FOR EXP. CONTROL CIRCUIT-13 (FIG.1.)

(1) $E_a$-1 = J2·($E_a > E_b$)·(B≠0)·(A13=0)
(2) $E_a$+1 = J2·($E_b > E_a$)·(A≠0)·(B13≠0)

FIG_7

$E_a → E_b$ GATE CONTROL CIRCUIT-86a (FIG.3.)

$E_a → E_b$ = J2·($E_a > E_b$)·(B=0)

FIG_8

$E_b → E_a$ GATE CONTROL CIRCUIT-88a (FIG.3.)

$E_b → E_a$ = J2·($E_b > E_a$)·(A=0)

FIG_9

INVENTOR.
GLYN H. JONES
BY
Christie, Parker & Hale
ATTORNEYS.

GATE CONTROL FOR MANTISSA CONTROL CIRCUIT-17

(1) SHIFT B L. = $j2 \cdot (E_b > E_a) \cdot (A \neq 0) \cdot (B13=0) + j4 \cdot (B13=0) \cdot Q04F$
(2) SHIFT B R. = $j2 \cdot (E_a > E_b) \cdot (B \neq 0) \cdot (A13 \neq 0) + j5 \cdot Q03F$
(3) $B1 \longrightarrow 0 = j2 \cdot (E_b > E_a) \cdot (A \neq 0) \cdot (B13=0)$
(4) $B13 \longrightarrow 0 = j2 \cdot (E_a > E_b) \cdot (B \neq 0) \cdot (A13 \neq 0)$
(5) $B13 \longrightarrow 1 = j5 \cdot (Q03F)$

FIG. 10

GATE CONTROL FOR COMPL. CONTROL CIRCUIT-18

COMPL. B = $j2 \cdot (E_a = E_b) \cdot SUB \cdot (A \geq B)$

FIG. 11

GATE CONTROL FOR EXP. CONTROL CIRCUIT-16 (FIG. 1)

(1) $E_b -1 = j2 \cdot (E_b > E_a) \cdot (A \neq 0) \cdot B13=0 + j4 \cdot (B13=0) \cdot Q04F$
(2) $E_b +1 = j2 \cdot (E_a > E_b) \cdot (B \neq 0) \cdot (A13 \neq 0) + j5 \cdot Q03F$

FIG. 12

GATE CONTROL FOR ADDING CIRCUIT-32 (FIG. 1)

$A + B + 001F \longrightarrow B = j3 + j6$

FIG. 13

A → X GATE CONTROL CIRCUIT-60 (FIG. 3)

(1) $A1 \xrightarrow{8C} X1 = j2 \cdot (E_b > E_a) \cdot (A \neq 0) \cdot (B13 \neq 0) \cdot I\,SUB \cdot Q04F'$
(2) $A1 \xrightarrow{7C} X1 = j2 \cdot (E_b > E_a) \cdot (A \neq 0) \cdot (B13 \neq 0) \cdot I\,SUB \cdot Q04F$
(3) $A1 \longrightarrow X1 = j2 \cdot (E_b > E_a) \cdot (A \neq 0) \cdot (B13 \neq 0) \cdot I\,ADD$

FIG. 14

B → X GATE CONTROL CIRCUIT-72 (FIG. 2)

(1) $B1 \xrightarrow{8C} X1 = j2 \cdot (E_a > E_b) \cdot (B \neq 0) \cdot (A13 \neq 0) \cdot I\,SUB \cdot Q04F'$
(2) $B1 \xrightarrow{7C} X1 = j2 \cdot (E_a > E_b) \cdot (B \neq 0) \cdot (A13 \neq 0) \cdot I\,SUB \cdot Q04F$
(3) $B1 \longrightarrow X1 = j2 \cdot (E_a > E_b) \cdot (B \neq 0) \cdot (A13 \neq 0) \cdot I\,ADD + j5 \cdot Q03F$

FIG. 15

X→B GATE CONTROL CIRCUIT-80 (FIG.2)
X→B = j4·(B13=0)·Q04F

FIG. 16

GATE CONTROL FOR SIGN CONTROL CKT.-19 (FIG.1)
ADJ. B SIGN = j2·($E_a$=$E_b$)

FIG. 17

GATE CONTROL FOR Q01FF (FIG.3)
(1) (GATE 102) SET=0 = j3
(2) (GATE 101) SET=1 = j2·($E_a$=$E_b$)·I SUB·Q04F + j4·Q04F'·(X≠A) + j5·Q03F'·(X≠A)

FIG. 18

GATE CONTROL FOR Q03FF (FIG.3)
(1) (GATE 104) SET=0 = j5·Q03F
(2) (GATE 103) SET=1 = j3·I ADD·$C_\omega$

FIG. 19

GATE CONTROL FOR Q04FF (FIG.3)
(1) (GATE 106) SET=0 = j2·($E_a$>$E_b$)·(B=0) + j2·($E_b$>$E_a$)·(A=0)
(2) (GATE 105) SET=1 = j2·($E_a$>$E_b$)·(B≠0)·(A13≠0)·(B1≠0) + j2·($E_b$>$E_a$)·(A≠0)·(B13≠0)·(A1≠0)

FIG. 20

X SHIFT GATE CONTROL CIRCUIT-82 (FIG.2)
(1) SHIFT X R. = j2·($E_a$>$E_b$)·(B≠0)·(A13≠0) + j2·($E_b$>$E_a$)·(A≠0)·(B13≠0)
(2) SHIFT X L. = j4·(B13=0)·Q04F

FIG. 21

X1→B1 GATE CONTROL CIRCUIT-80 (FIG.3)
X1→B1 = j4·(B13=0)·Q04F

FIG. 22

X GATE CONTROL CIRCUIT-89 (FIG.2)
SET X→0 = j6

FIG. 23

INVENTOR.
GLYN H. JONES
BY
Christie, Parker & Hale
ATTORNEYS.

FIG. 25A

3,244,864
SUBTRACTION UNIT FOR A DIGITAL COMPUTER
Glyn H. Jones, Hacienda Heights, Calif., assignor to Burroughs Corporation, Detroit, Mich., a corporation of Michigan
Filed Dec. 10, 1962, Ser. No. 243,252
8 Claims. (Cl. 235—168)

This invention relates broadly to digital computers and more particularly to an improvement in subtracting circuits of an arithmetic unit for a digital computer.

Digital computers are well known which perform arithmetic operations on floating point numbers. The floating point numbers are represented by a number composed of digits referred to as a mantissa and an exponent which provides an indication of the position of the decimal point in the number. Addition and subtraction is performed by first aligning the two numbers in registers in which they are stored, complementing the smaller number and then adding the complemented and uncomplemented numbers together to form a result. Alignment is performed by first shifting the number with the larger exponent in the direction of the most significant digit in the register in which it is stored and concurrently adjusting the exponent, and subsequently shifting the number having the smaller exponent in the opposite direction in the register in which it is stored and concurrently adjusting its exponent until the exponents of the two numbers are equal. The digits of the number having the smaller exponent which are shifted out of the register in which they are stored during the alignment operation are lost and form no part of the result of the subtraction.

The accuracy of the result formed by the arithmetic unit of many computers is increased by double precision wherein an extra register is provided for doubling the length of the registers storing mantissas of the two numbers. However, many times this much additional accuracy is not needed and the cost of the additional registers substantially increases the cost of the arithmetic unit.

After a subtraction operation is complete, many times there is a leading zero in the result. It has been found that a substantial increase in the accuracy of the result of a subtraction operation, particularly if the difference between numbers is small, may be obtained by complementing the last digit, of the number having the smaller exponent, which is shifted out of the register in which it is stored during alignment, storing such complemented digit, shifting the result number one digit position in the direction of the most significant digit if there is a leading zero digit and storing the stored complemented digit back into the least significant digit position of the result register. It has also been found through a series of tests that if there is more than one leading zero digit in the result, only a single digit was shifted out of the register containing the number with the smaller exponent during the alignment operation. It has also been found that if more than one digit is shifted out of the register containing the number with the smaller exponent during alignment, the maximum number of leading zero digits in the result is one. Thus, it becomes apparent that the accuracy of the result formed during a subtraction operation by a digital computer is effectively increased one digit by only providing storage and associated processing circuits for the last digit of the number having the smaller exponent which is shifted out of the register in which it is stored. Also, it is useless to provide means for shifting more than one digit into the result register as there is either a single digit shifted out of the register or there is but a single leading zero.

However, the accuracy of the last digit of the number having the smaller exponent which is shifted out of the register in which it is stored may also be increased by rounding it off by providing one additional digit of storage and rounding off such last digit corresponding to the value of the additional digit.

Briefly, a specific embodiment of the present invention comprises an improvement in a digital computer arithmetic unit arranged for electrically subtracting one floating point number represented by mantissa digits and an exponent from another by electrically aligning the numbers by shifting the mantissa of the number having the larger exponent in the direction of the most significant digit and electrically shifting the mantissa of the number with the smaller exponent in the direction of the least significant digit in the register in which they are stored until the mantissas are aligned, electrically complementing the smaller mantissa and combining the complemented and uncomplemented mantissas to form a result corresponding to the difference between the two original numbers and storing the result in a register the arrangement including, means for electrically complementing the last digit of the number with the smaller exponent which is shifted out of the register in which it is stored, means for storing the digit formed by the complementing means, means for selectively and electrically shifting the result in the register in which it is stored one digit position in the direction of the most significant digit if there is at least one leading zero digit in the result and means for electrically shifting the stored digit into the result register concurrently with the shifting of the result for increasing the accuracy of such result.

These and other aspects of the present invention may be more fully understood with reference to the following description of the specification and drawings, in which:

FIG. 10 shows the logical equations for the gating circuit of the timing generator for controlling the operation of the B mantissa control circuit shown in FIG. 1;

FIG. 11 is a logical equation of the gating circuit of the timing generator for controlling the operation of the B mantissa complement control circuit shown in FIG. 1;

FIG. 12 shows the logical equations of the gating circuit of the timing generator for controlling the operation of the B mantissa exponent control circuit shown in FIG. 1;

FIG. 13 shows the logical equation of the gating circuit of the timing generator for controlling the operation of the adding circuit shown in FIG. 1;

FIG. 14 shows the logical equations for the $A \rightarrow X$ gate control circuit of the complement and transfer circuit shown in FIG. 2;

FIG. 15 shows the logical equations for the $B \rightarrow X$ gate control circuit of the complement and transfer circuit shown in FIG. 2;

General description

Figure 1:
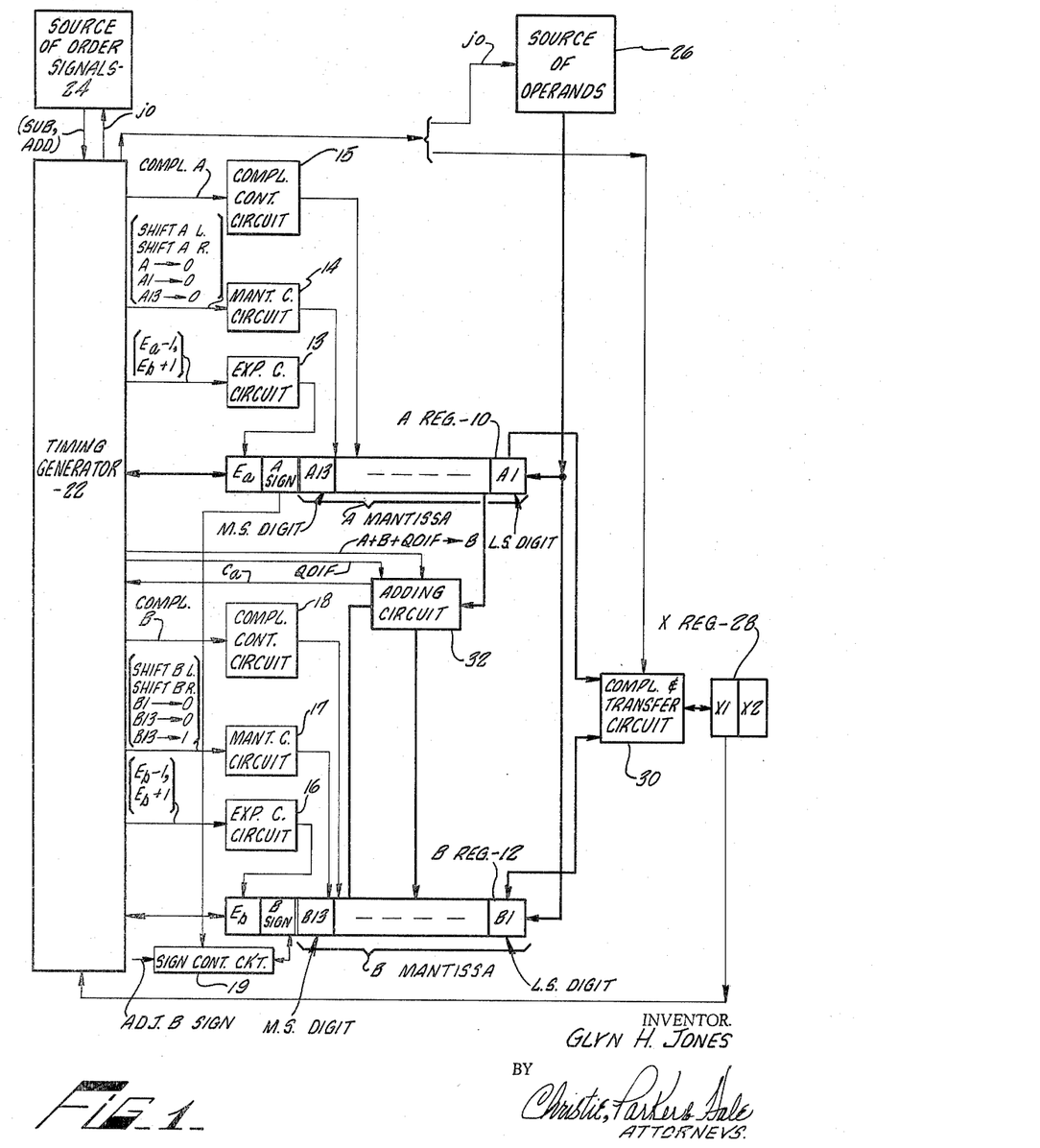
FIG. 1 is a general block diagram of an adding and subtracting unit for a digital computer and embodies the present invention.

Refer now to FIG. 1 which shows a general block diagram of the adding and subtracting unit embodying the present invention.

A and B registers 10 and 12 are provided for storing two numbers which are to be added or subtracted. The A register 10 has a plurality of flip-flops for storing a number represented by a mantissa, a mantissa sign and an exponent. The section for storing the exponent is referenced by the symbol "$E_a$." The section for storing the sign is referenced by the symbol "A sign" and the section for storing the mantissa is referenced by the symbol "A mantissa." The exponent of the number stored in A register 10 specifies the position of the radix point in the mantissa with respect to the least significant end of the mantissa section of the A register 10. The mantissas of the number stored in the A register 10 are broken down into 13 binary-coded-octal digits. The mantissa portion of the A register 10 has 13 digit storage sections for storing the octal digits of the mantissa.

The B register 12 is similar to the A register 10 having flip-flops arranged in sections referenced by the symbols "$E_b$," "B sign" and "B mantissa" for storing the exponent, the sign and the mantissa of a number. The sections $E_b$, B sign and B mantissa are essentially identical to the sections $E_a$, A sign and A mantissa, respectively, of the A register 10.

An exponent control circuit 13 is provided having conventional counting control or gating circuits (not shown) for adjusting the exponent stored in the section $E_a$ of the A register 10 corresponding to the number of digit positions the mantissa stored in the A register 10 is shifted. A mantissa control circuit 14 is provided having conventional gating circuits (not shown) for shifting the mantissa stored in A register 10 and performing other functions on the A mantissa described in detail in the following section entitled "Detailed Description." A complement control circuit 15 is provided having conventional gating circuits for forming the sevens complement (radix minus one complement) of the mantissa digits stored in A register 10 and for storing the complemented digits back into the A mantissa section of the A register 10.

An exponent control circuit 16, a mantissa control circuit 17 and a complement control circuit 18 are associated with the B register 12 and are similar to and are provided for performing similar functions as the exponent control circuit 13, the mantissa control circuit 14 and the complement control circuit 15 which are associated with the A register 10.

To be explained in detail, the result of an addition or subtraction is always stored into the B register 12. A sign control circuit 19 is provided with conventional gating circuits for adjusting the signals representing the sign of the result stored in the B sign section to those representing a positive or a negative sign in accordance with the sign of the result.

A timing generator 22 is provided for forming timing signals for controlling the operation of the circuits of the adding and subtracting unit shown in FIG. 1. A source of program signals 24 provides order signals to the timing generator 22 specifying whether addition or subtraction is to take place. A source of operands 26 supplies operands or numbers (including mantissa, mantissa sign and exponent) and stores such operands or numbers into the A and B registers 10 and 12.

A complement and transfer circuit 30 is provided for complementing the digits shifted out of the A and B registers 10 and 12 and for transferring digits between the X register 28 and the A and B registers 10 and 12. The complement and transfer circuit 30 also shifts the digits stored in the X register 28. All digits transferred out of the X register 28 are stored into the B register 12.

An adding circuit 32 combines the mantissas of the numbers stored in the A and B registers 10 and 12 and stores the result into the B mantissa section of the B register 12. The adding circuit 32 has a carry output circuit referenced by the symbol $C_a$ at which a control signal is applied whenever there is a carry out from an addition. The adding circuit 32 contains thirteen conventional series-parallel adding circuits similar to that shown and described in section 6–15 of the book entitled "Digital Computer Fundamentals" by Thomas C. Bartee, published by the McGraw-Hill Book Company, Inc. in 1960. However, the series-parallel adding circuits are arranged for adding in the octal number system rather than the decimal number system which is shown in the book "Digital Computer Fundamentals."

With the general block diagram in mind, consider the following brief description of the operation of the adding and subtracting unit of FIG. 1. Initially, the source of operands 26 stores operands into the A and B registers 10 and 12 and the source of order signals 24 provides an order to the timing generator 22 specifying whether addition or subtraction is to take place.

Although the source of program signals 24 provides an order specifying addition or subtraction is to take place, whether the two numbers stored in the A and B registers 10 and 12 are actually algebraically added or subtracted of course depends not only on the order but on the signs of the two numbers stored in the A and B sign sections. In the case of an algebraic addition, an "internal add" is said to take place. In the case of an algebraic subtraction, an "internal subtract" is said to take place.

The following brief description is given assuming that an internal subtract is to take place for purposes of illustrating the invention. During internal subtract, the adding and subtracting unit of FIG. 1 performs four basic operations referred to as alignment, complement, combine, and normalize result operations. There are other operations described in the section entitled Detailed Description which are incidental to the basic operations. However, the basic operations are the important operations which should be understood in order to understand the invention.

First consider the alignment operation. During the alignment operation, the mantissa control circuits 14 and 17 shift the mantissas of the two numbers stored in the A and B registers 10 and 12 and the exponent control circuits 13 and 16 adjust the exponents of the numbers until the numbers are aligned with the exponents of the numbers equal.

A normalizing shift operation and a scaling shift operation will be referred to in the following description of the alignment operation. A normalizing shift operation is one wherein the mantissa of a number is shifted in the direction of the most significant digit of the mantissa and the corresponding exponent is decreased one unit for each digit position the mantissa is shifted. A scaling shift operation is defined herein as being one wherein the mantissa of the number stored in one of the registers is shifted in the direction of the least significant digit and the corresponding exponent is increased one unit for each digit the mantissa is shifted.

In general, alignment takes place by first normalizing the number with the larger exponent until either (1) the exponents are equal or (2) the first non-zero digit (most significant digit) of the mantissa of the number being normalized is shifted into the most significant digit section (or position) of the register. If the condition (1) occurs, the numbers are aligned and the complement operation takes place. If the first non-zero digit of the number being normalized is shifted into the most significant digit section of the corresponding register before the exponents of the two numbers are adjusted to equality, the number having the smaller exponent is then scaled.

The scaling of the number having the smaller exponent takes place until either (1) the exponents become equal (the numbers are aligned) or (2) the mantissa of the number being scaled is shifted out of the register in which it is stored at which time the alignment operation terminates.

As the number having the smaller exponent is scaled, mantissa digits are shifted out of the least significant end of the corresponding register. The complement and transfer circuit 30 receives the digits shifted out of the register, forms the eights complement (radix complement) of all digits up to and including the first non-zero digit and the sevens complement (radix minus one complement) of all subsequent digits shifted out of the register, and stores the complemented digits into the X register 28. The complement and transfer circuit 30 also shifts the content of the X register 28 to the right one digit for each digit stored. Thus, the X register 28 effectively stores the last two digits shifted out of the register in which a number is being scaled.

It should be noted that the radix complement of zero digits is a digit zero hence actually the complement and transfer circuit 30 could be arranged for storing the zero digits directly into the X register 28 and for only forming the radix complement of the first non-zero digit and the result would be the same.

After the numbers are aligned, the complement operation takes place. The internal subtract operation takes place by using the conventional technique of complementing the smaller number and adding the complemented and uncomplemented numbers together. Since the exponents of the aligned numbers are equal following the alignment operation, the smaller number is the one having the smaller mantissa.

The complement control circuits 15 and 18 complement the smaller mantissa by taking the sevens complement (radix minus one complement) of each of the digits, and store the complemented digits back into the same register in which the uncomplemented digits were originally stored. It should be noted that assuming a non-zero digit has been scaled out of the register in which the corresponding number is stored, the register containing the scaled and complemented number in combination with the X register 28 together contain the radix complement of the scaled number. This is true as the radix complement was formed of all digits up to and including the first non-zero digit scaled out of the corresponding register, and the radix minus one complement was formed of all the rest of the mantissa digits. See for a more detailed discussion of complementing procedures the sections 3–12, 3–13, 3–14 of the book entitled "Digital Computer Fundamentals" by Thomas C. Bartee, published by the McGraw-Hill Book Company, Inc. in 1960.

Following the complementing operation, the combine operation takes place.

The adding circuit 32 performs the combine operation by adding the complemented and uncomplemented mantissa digits together and storing the result into the B register 12.

After the combine operation, the normalize result operation takes place whenever there is a zero leading digit in the result mantissa stored in the B register 12 and at least one non-zero digit was shifted out of the register during the scale operation. The mantissa control circuit 17 and the exponent control circuit 16 cause the result stored in the B register 12 to be normalized by shifting the mantissa thereof one digit position in the direction of the most significant digit. Concurrently the complement and transfer circuit 30 transfers the most significant digit stored in the X register 28 back into the least significant digit position of the B register 12 and the normalize result operation is terminated.

After the normalize result operation terminates, the round-off operation takes place. Assuming an internal subtract is taking place and that more than one non-zero digit was scaled out of the corresponding register, the adding circuit 32 adds one unit to the mantissa of the result contained in the B register 12 if the next most significant digit contained in the X register 12 after the one shifted into the result in the B register 12 is equal to or greater than one-half of eight (the radix of the numbers subtracted). The result is then rounded and the round result operation terminates.

The source of program signals 24 then provides a new order to the timing generator 22 and the source of operands 26 provides new operands for storage in the A and B registers 10 and 12 and the operations are repeated.

A better understanding of the operations described above may be had by examining the following Table I which gives an example of the sequence with which an internal subtract is performed on two numbers according to the invention. The example shown in Table I assumes that the mantissas have only six octal digits.

TABLE I

|  | Exp. | Mantissa | X Reg. |
|---|---|---|---|
| A Reg. | 6 | 0 1 0 2 5 0 | |
| B Reg. | 3 | 7 3 3 7 1 3 | |
| Alignment Operation: | | | |
| (1) Normalize— | | | |
| A Reg. | 5 | 1 0 2 5 0 0 | |
| B Reg. | 3 | 7 3 3 7 1 3 | |
| (2) Scale— | | | |
| A Reg. | 5 | 1 0 2 5 0 0 | |
| B Reg. | 4 | 0 7 3 3 7 1 | 5 |
| A Reg. | 5 | 10 2 5 0 0 | |
| B Reg. | 5 | 0 0 7 3 3 7 | 6 5 |
| Complement Operation: | | | |
| A Reg. | 5 | 1 0 2 5 0 0 | |
| B Reg. | 5 | 7 7 0 4 4 0 | 6 5 |
| Combine Operation: | | | |
| A Reg. | 0 | 0 0 0 0 0 0 | |
| B Reg. | 5 | 0 7 3 1 4 0 | 6 5 |
| Normalize Result: | | | |
| A Reg. | 0 | 0 0 0 0 0 0 | |
| B Reg. | 4 | 7 3 1 4 0 6 | 5 |
| Round Result: | | | |
| A Reg. | 0 | 0 0 0 0 0 0 | |
| B Reg. | 4 | 7 3 1 4 0 7 | ← Final Result |

*Detailed description*

Figure 2:
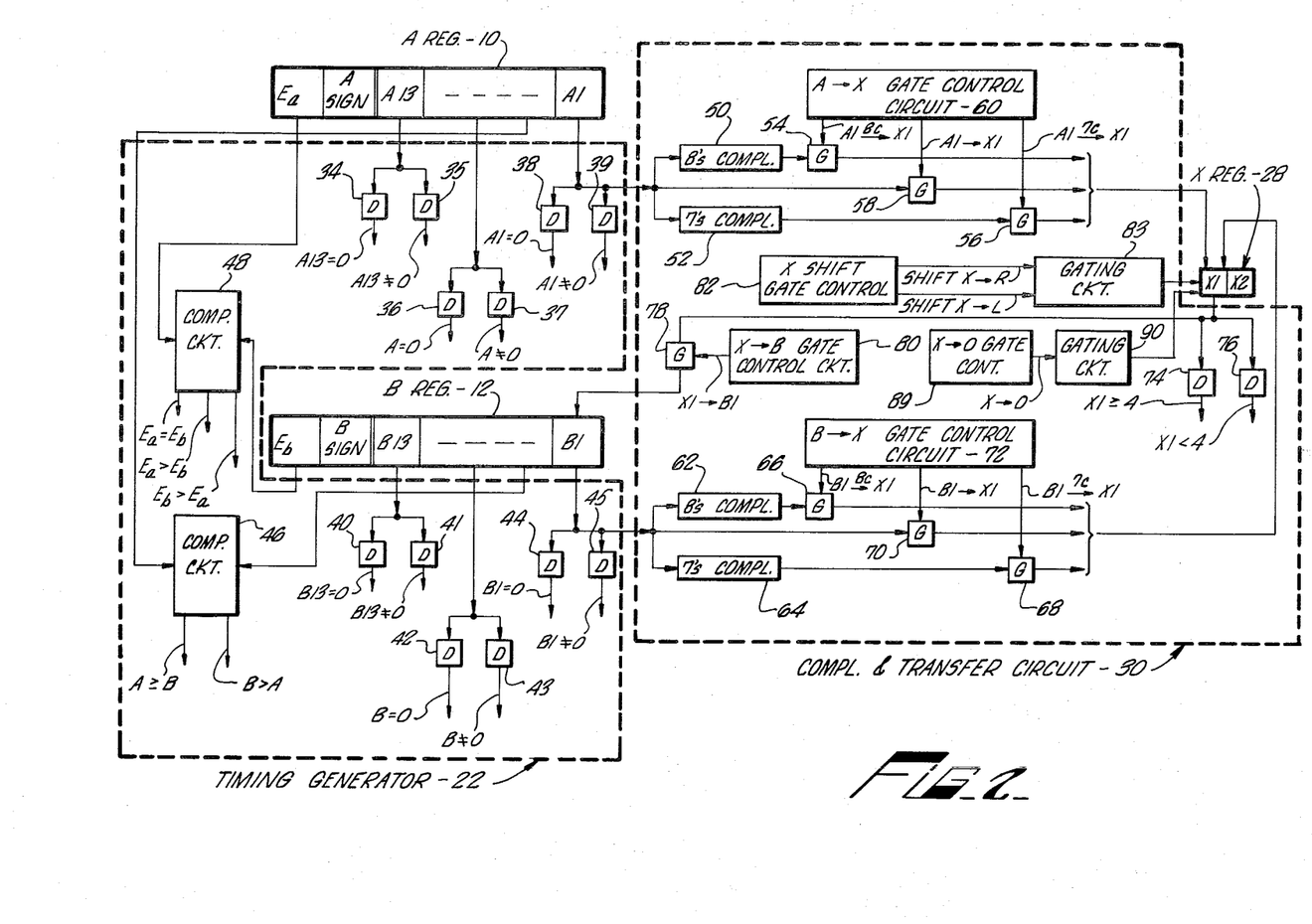
FIG. 2 is a block diagram showing the A and B registers of FIG. 1 along with a detailed block diagram of the complement and transfer circuit and a portion of the timing generator shown in the adding and subtracting unit of FIG. 1.

Refer now to FIG. 2 which shows a detailed block diagram of portions of the timing generator 22 and the details of the complement and transfer circuit 30. The timing generator 22 contains conventional decoding circuits 34 through 39 for providing various control signals indicative of the value of digits of the mantissa and of the position of the mantissa in the mantissa section of the A register 10. The decoding circuits 34 and 35 have conventional gating circuits for providing control signals at output circuits represented by symbols $A13=0$ and $A13\neq 0$ whenever the most significant digit position of the A register 10, section A13, is storing a digit zero and a digit other than zero, respectively. The decoding circuits 36 and 37 have output circuits represented by the symbols $A=0$ and $A\neq 0$ at which output signals are provided whenever a complete mantissa is stored in the A register 10 which is equal to zero. The decoding circuits 38 and 39 have conventional gating circuits with output circuits referenced by the symbols $A1=0$ and $A1\neq 0$ to which control signals are applied whenever the least significant digit position of the A register 10, section A1, is storing a digit zero and a digit other than zero, respectively.

Associated with the B register 12 are decoding circuits 40 through 45. The decoding circuits 40 through 45 are identical to the decoding circuits 34 through 39 and provide control signals indicative of the same information in the B register 12 as the decoding circuits 34 through 39 do for the A register 10. The output circuits of the decoding circuits 40 through 45 are referenced by the same symbols as the output circuits of the decoding circuits 34 through 39 except that a B is affixed to each symbol rather than an A.

The timing generator 22 also contains a compare circuit 46. The compare circuit 46 is a conventional gating circuit having output circuits referenced by the symbols $A \geq B$ and $B > A$ to which control signals are applied whenever the mantissa stored in the A register 10 is equal to or greater than the mantissa stored in the B register 12, and the mantissa stored in the B register 12 is greater than the mantissa stored in the A register 10, respectively.

The timing generator 22 also contains a compare circuit 48. The compare circuit 48 is a conventional gating circuit having output circuits referenced by the symbols $E_a=E_b$, $E_a>E_b$ and $E_b>E_a$ to which control signals are applied whenever the exponent stored in the A register 10 is equal to the exponent stored in the B register 12, the exponent in the A register 10 is greater than the exponent in the B register 12 and the exponent in the B register 12 is greater than the exponent in the A register 10, respectively.

Refer now to the complement and transfer circuit 30b shown in FIG. 2. An 8's complement circuit 50 and a 7's complement circuit 52 are provided for complementing the octal digit stored in the least significant digit position of the A register 10, section A1. The 8's complement circuit 50 is a conventional gating circuit for forming the eights complement of the digit stored in section A1 and providing signals corresponding thereto to a gating circuit 54. The 7's complement circuit 52 is a conventional gating circuit for forming the sevens complement of the digit stored in section A1 and for applying signals corresponding thereto to a gating circuit 56. A gating circuit 58 receives the output signals of the A1 digit section. The gating circuits 54, 56 and 58 are conventional gating circuits for storing signals corresponding to those applied to their input circuits into the X1 digit section of the X register 28 under control of an $A \rightarrow X$ gate control circuit 60. The logical equations for the $A \rightarrow X$ gate control circuit 60 are shown in FIG. 14 and will be described hereinbelow.

An 8's complement circuit 62 and a 7's complement circuit 64 are also provided in the complement and transfer circuit 30 and are associated with the B register 12 for forming the eights and sevens complements of the digit stored in the B1 section. Gating circuits 66, 68 and 70 are provided having input circuits connected to the output circuits of the 8's complement circuit 62, the 7's complement circuit 64 and the B1 section of the B register 12. The 8's complement circuit 62, the 7's complement circuit 64 and the gating circuits 66, 68 and 70 are identical to the 8's complement circuit 50, 7's complement circuit 52 and gating circuits 54, 56 and 58 and provides the same function in connection with the B register 12 as they later do in connection with the A register 10. Also within the complement and transfer circuit 30 is a $B \rightarrow X$ gate control circuit 72 for controlling the operation of the gating circuits 66, 68 and 70. The details of the logical equations of the gating circuits for the $B \rightarrow X$ gate control circuit 72 are shown in FIG. 15.

The complement and transfer circuit 30 also contains decoding circuits 74 and 76 for providing control signals indicative of the digits stored in the X1 section of the X register 28. The decoding circuits 74 and 76 are conventional gating circuits and have output circuits referenced by the symbols $X1 \geq 4$ and $X1 < 4$, respectively, to which control signals are applied whenever the digit stored in the X1 digit position of the X register 28 is equal to or greater than an octal digit 4 and the digit stored in the X1 digit position of the X register 28 is less than an octal digit 4, respectively.

Figure 16:
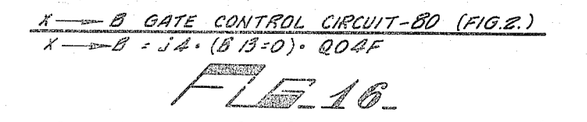
FIG. 16 shows the logical equation for the $X1 \rightarrow B1$ gate control circuit of the complement and transfer circuit shown in FIG. 2.

A conventional gating circuit 78 is provided in the complement and transfer circuit 30 for storing the digit contained in the X1 section of the X register 28 into the B1 section of the B register 12. An $X1 \rightarrow B1$ gate control circuit 80 provides the control signals to the gating circuit 78. The logical equations for the $X \rightarrow B$ gate control circuit 80 are shown in FIG. 16.

Figure 21:
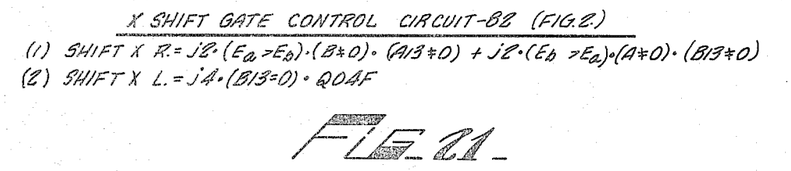
FIG. 21 shows the logical equations for the X shift control circuit of the complement and transfer circuit shown in FIG. 2.

A shift gating circuit 83 is provided having conventional gating circuits for shifting the content of the X register 28 to the right and left. A shift gate control circuit 82 is provided for controlling the time at which and the direction in which the shift gating circuit 83 shifts the content of the X register 28. The logical equations of the shift gate control circuit 82 are shown in FIG. 21.

Figure 22:
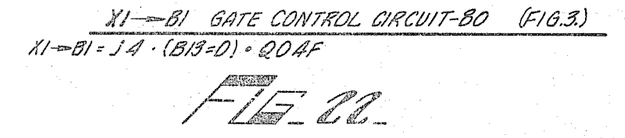
FIG. 22 shows a logical equation for the $X1 \rightarrow B1$ gate control circuit 80 shown in FIG. 3.

A gating circuit 90 is provided in the complement and transfer circuit 30 for storing a digit zero into each of the sections X1 and X2 of the X register 28. An $X \rightarrow 0$ gate control circuit 89 is provided for applying a control signal to the gating circuit 90 whenever digit zeros are to be stored in the X register 28. The logical equation of the gating circuit for the $X \rightarrow 0$ gate control circuit 89 is shown in FIG. 22.

Figure 3:
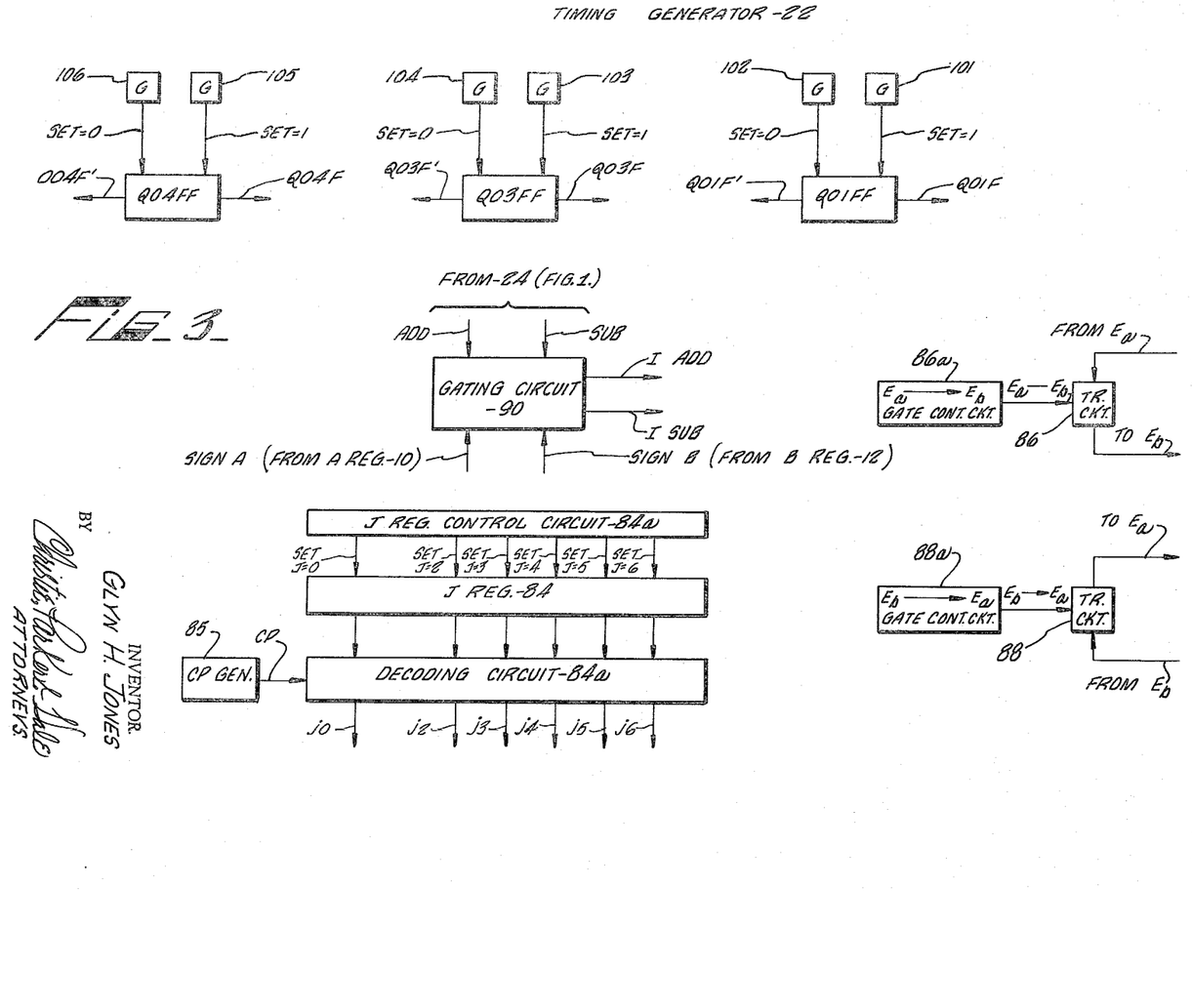
FIG. 3 is a block diagram of part of a portion of the timing generator shown in the adding and subtracting unit of FIG. 1.

Refer now to FIG. 3 which shows the rest of the detailed block diagram of the timing generator 22. The timing generator 22 contains a J register 84 along with a decoding circuit 84b for providing timing pulses to various circuits of the adding and subtracting circuit of FIG. 1, noted hereinbelow.

The J register 84 is a conventional flip-flop register having five states of operation referred to as states 0 and two through six. The decoding circuit 84a has a control circuit connected to a clock pulse generator 85. The decoding circuits 84a has output circuits $j0$ and $j2$ through $j6$ corresponding to the states zero and two through six, respectively, of the J register 84. The decoding circuit is a conventional gating circuit for providing a synchronizing pulse at the output circuit thereof corresponding to the state of the J register 84 during each clock pulse.

It will be noted that state one of the J register 84 has been skipped and is not used herein but is used for other computing functions not described herein.

Figure 4:
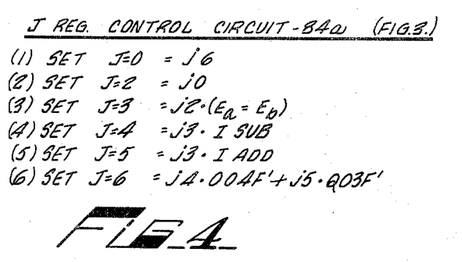
FIG. 4 shows the logical equations for the J register control circuit of the timing generator shown in FIG. 3.

The J register 84 has five input circuits referenced by the symbols SET $J=0$ and SET $J=2$ through SET $J=6$. The J register 84 contains gating circuits (not shown) for setting the flip-flop circuits thereof into states zero and two through six in response to control signals at the input circuits SET $J=0$, and SET $J=2$ through SET $J=6$, respectively. A J register control circuit 84a provides the set control signals to the J register 84. The logical equations of the gating circuits in the set J register control circuit 84a are shown in FIG. 4.

The timing generator 22 also contains transfer circuits 86 and 88. The transfer circuits 86 and 88 contain conventional gating circuits for transferring the exponent signal stored in the section $E_a$ of the A register 10, into the exponent section $E_b$ of the B register 12 and for transferring the exponent signals stored in the exponent section $E_b$ of the B register 12 into the exponent section $E_a$ of the A register 10, respectively.

Figure 8:
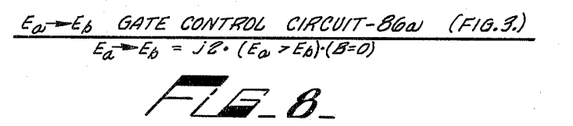
FIG. 8 shows the logical equation for the $E_a \rightarrow E_b$ gate control circuit of the timing generator shown in FIG. 3.
Figure 9:
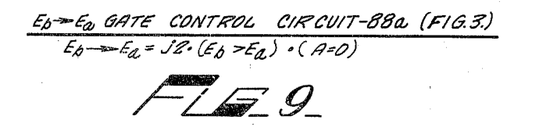
FIG. 9 shows the logical equation for the $E_b \rightarrow E_a$ gate control circuit of the timing generator shown in FIG. 3.

The gating circuits for controlling the operation of the transfer circuits 86 and 88 are referenced by the symbols 86a and 88a. The logical equations for the gate control circuits 86a and 88a are shown in FIGS. 8 and 9, respectively.

Figures 24, 25B:
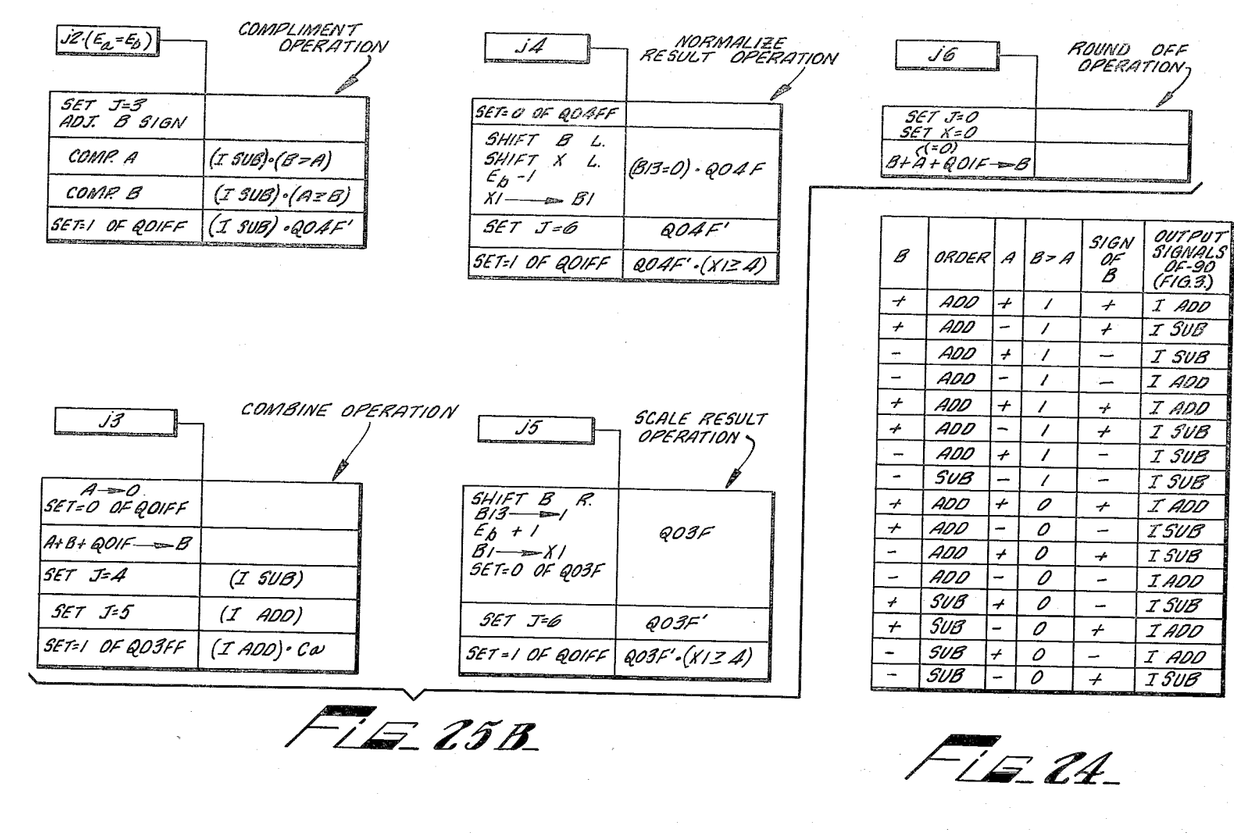
FIG. 24 shows a table illustrating the operation of the B sign control circuit shown in FIG. 1 and the operation of the gating circuit 90 shown in FIG. 3.
FIGS. 25A and 25B contain flow diagrams for illustrating the sequence of operation of the adding and subtracting unit shown in FIG. 1.

A gating circuit 90 is provided for forming control signals at output circuits referenced by the signals I ADD and I SUB designating internal add or internal subtract is to take place. A table illustrating the conditions whereby the gating circuit 90 provides control signals at the output circuits I ADD and I SUB for the various conditions of the signs of the numbers stored in the A sign and B sign sections of the A and B registers 10 and 12 and for the type of order provided by the source of order signals 24 is shown in FIG. 24.

Figure 18:
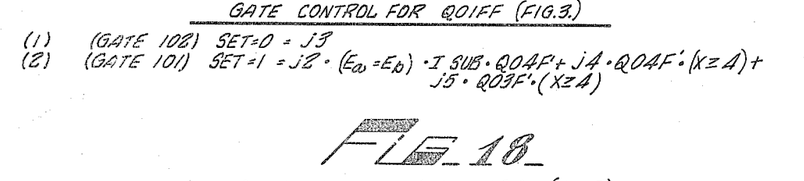
FIG. 18 shows the logical equations of the gating circuits of the timing generating for controlling the operation of the Q01FF timing flip-flop shown in FIG. 3.
Figure 19:
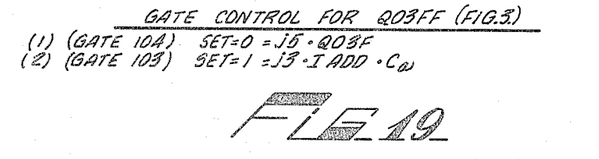
FIG. 19 shows the logical equations of the gating circuits of the timing generator for controlling the operation of the Q03FF timing flip-flop shown in FIG. 3.
Figure 20:
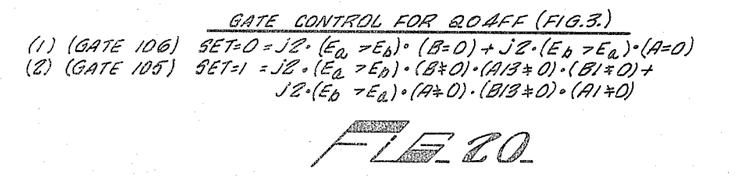
FIG. 20 shows the logical equations of the gating circuits of the timing generator for controlling the operation of the Q04FF timing flip-flop shown in FIG. 3.

The timing circuit 22 also contains timing flip-flops Q01FF, Q03FF and Q04FF. Symbols 1 and 0 are used herein to represent the true and false states, respectively, of the timing flip-flops. The SET=1 and a SET=0 input circuits of the Q01FF flip-flop are connected to the gating circuits 101 and 102, respectively. The logical equations of the gating circuits 101 and 102 are shown in FIG. 18. The SET=1 and SET=0 input circuits of the Q03FF flip-flop are connected to gating circuits 103 and 104, respectively. The logical equations for the gating circuits 103 and 104 are shown in FIG. 19. The SET=1 and SET=0 input circuits of the Q04FF flip-flop are connected to gating circuits 105 and 106, respectively. The logical equations for the gating circuits 105 and 106 are shown in FIG. 20.

Refer now to the logical equations shown in FIGS. 4 through 21. The logical equations of FIGS. 4 through 21 have symbols representative of various output circuits of the adding and substracting unit of FIG. 1. At the left hand side of an equal sign in the figures, symbols are shown representative of output circuits of gating circuits on which control signals are applied whenever certain conditions exist. The conditions necessary for the gating circuits to form the control signals are represented by the symbols at the right hand side of the equal signs. For example, Equation 6 of FIG. 4 designates that a control signal will be applied at the $J=6$ output circuit of the J register control circuit 84a whenever a control signal is applied at the $j4$ output circuit and the Q04F′ output circuit, or control signals are applied at the $j5$ output circuit and the Q03F′ output circuit (see FIG. 3).

Figure 4A:
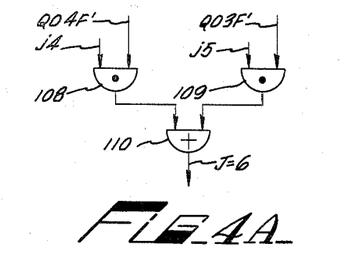
FIG. 4A shows a typical circuit diagram illustrating how the logical Equation 6 shown in FIG. 4 is implemented.

A · symbol is used in the logical equations to indicate that the output circuits represented by the symbols on either side thereof are anded together. A + symbol is used in the logical equations to indicate that the output circuits represented by the symbols on either side thereof are to be ored together. FIG. 4A is a schematic diagram illustrating how the Equation 6 of FIG. 4 can be implemented with "and" and "or" gating circuits. Referring to FIG. 4A, the $j4$ and Q04F′ output circuits are anded together by an "and" gating circuit 108. The $j5$ and Q03F′ output circuits are anded together by an "and" gating circuit 109. The output circuits of the "and" gating circuits 108 and 109 are ored together by an "or" gating circuit 110. The output circuit of the "or" gating circuit 110 is the output circuit $J=6$. Implementation of the other logical equations of FIGS. 4 through 21 are not shown herein but may be implemented similar to the implementation of Equation 6 of FIG. 4 shown in FIG. 4A.

Figure 25A:
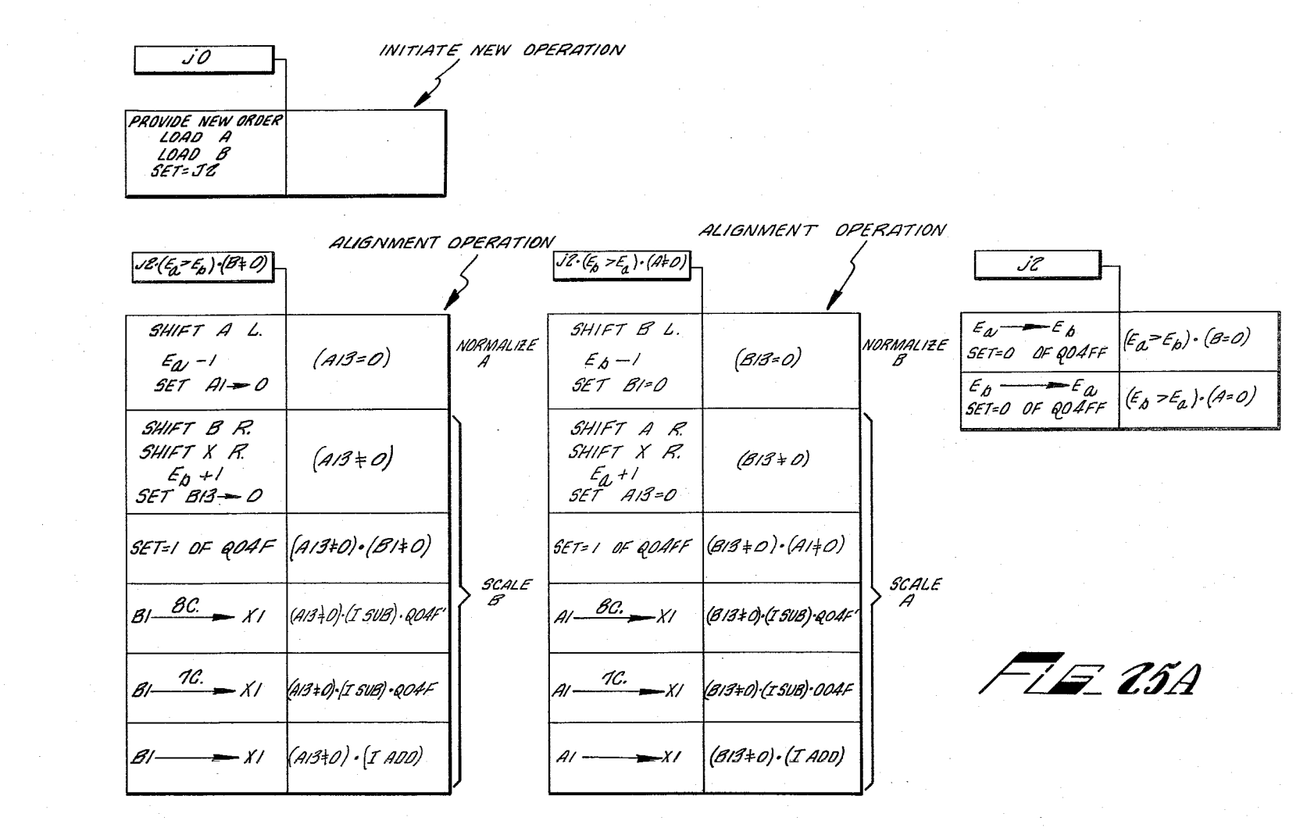

FIGS. 25A and 25B are flow diagrams for simplifying the explanation of the logical equations of FIGS. 4 through 21. The flow diagrams of FIGS. 25A and 25B are arranged in blocks with a separating line dividing the blocks into two sections. At the right hand side of each block is a logical equation corresponding to one or more terms of one of the logical equations of FIGS. 4 through 21. Some of the blocks are arranged together in groups at the top of each block or a group of connected blocks of FIGS. 25A and 25B is a separate block connected to the block or group of blocks which also contains a logical equation corresponding to parts of the logical equations of FIGS. 4 through 21. The complete logical equation for any block corresponding to one or more logical equations of FIGS. 4 through 21 may be obtained by anding the term at the top of the block or a group of blocks with the term or terms at the right hand section of the connected block or blocks. At the left hand section of each block is one or more symbols corresponding to output circuits of the adding and substracting unit of FIG. 1. A control signal is applied at the output circuits represented by the symbols at the left hand section of each block whenever control signals are applied at the output circuits according to the equation at the right hand section of the corresponding block and the separate block at the top of the block or group of blocks.

A description of the operation of the adding and subtracting unit of FIG. 1 will now be given with reference to the circuits of FIGS. 1 through 3 and the logical equations of FIGS. 4 through 21 by describing the operation of the circuits illustrated in the flow diagram of FIGS. 25A and 25B and making reference to the corresponding logical equations.

Refer now to the upper left hand block of the flow diagram of FIG. 25A. Initially the J register 84 (FIG. 3) is set into state 0. The signal at the $j0$ output circuit of the decoding circuit 84b causes a new order signal to be applied to the timing generator 22 by the source of order signals 24 and causes the source of operands 26 to store new numbers or operands in the A and B registers 10 and 12. Additionally, the control signal at the $j0$ output circuit causes a control signal at the SET $J=2$ output circuit of the J register control circuit 84a (see Equation 2, FIG. 4). This causes the J register 84 to be set into state two.

*Alignment operation*

The alignment operation takes place while the J register 84 is in state two. Assuming the number stored in the A register 10 has the larger exponent, the number stored in the A register 10 is normalized and the number stored in the B register is scaled until the exponents are equal or one of the mantissa is shifted out of the B register 12. The group of blocks shown in the lower left hand side of FIG. 25A illustrates the alignment operation when the exponent of the number stored in the A register 10 is the larger of the two exponents.

Figure 5:
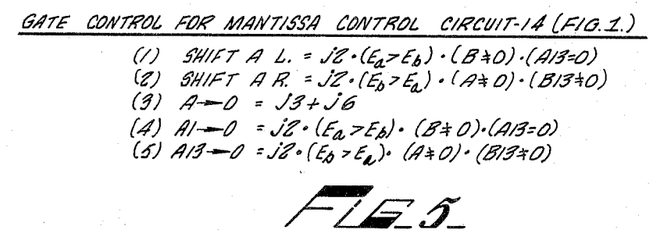
FIG. 5 shows the logical equations for the gating circuit of the timing generator for controlling the operation of the A mantissa control circuit shown in FIG. 1.
Figure 7:
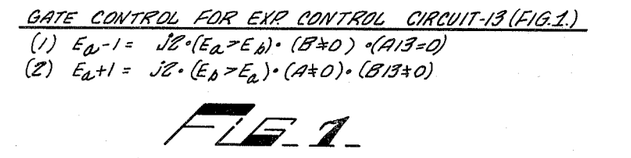
FIG. 7 shows the logical equations for the gating circuits of the timing generator for controlling the operation of the A exponent control circuit shown in FIG. 1.

Assume now that the J register 84 is in state two, the compare circuit 48 (FIG. 2) applies a control signal at the $E_a > E_b$ output circuit and the decoding circuit 43 applies a control signal at the $B \neq 0$ output circuit (FIG. 2) thereby indicating that the number stored in the A register 10 has the larger exponent and the mantissa stored in the B register 12 is not equal to zero. Also, assume that the decoding circuit 34 (FIG. 2) applies a control circuit at the output circuit $A13=0$ thereby indicating that the mantissa stored in the A register 10 is not normalized with the first known zero digit in the most significant digit position of the A register 10. Under these conditions control signals are applied at the SHIFT AL, the $E_a - 1$ and the SET $A1 \rightarrow 0$ output circuits (see Equation 1, FIG. 5; Equation 1, FIG. 7; Equation 4, FIG. 5). These control signals cause the mantissa control circuits 14 to shift the mantissa of the numbers stored in the A register 10 to the left a digit at a time and cause the exponent control circuit 13 to decrease the value of the exponent stored in section $E_a$ one unit until the mantissa is shifted with the most significant digit in the most significant digit section of the A register 10.

Assume that the J register 84 is still in state two, that the exponent in the A register 12 is still larger than that in the B register 12 causing a control signal at the $E_a > E_b$ output circuit and that the mantissa of the number in the A register 10 is normalized causing the decoding circuit 35 (FIG. 2) to provide a control signal at the $A13 \neq 0$ output circuit. Also assume that the content of the mantissa section of the B register 12 is not equal to zero causing the decoding circuit 43 to apply a control signal at the $B \neq 0$ output thereof.

At this point, control signals are applied at the output circuits SET $B13 \rightarrow 0$, $E_b + 1$, SHIFT BR., and SHIFT XR. output circuits (see Equation 2, FIG. 10; Equation 2, FIG. 12; Equation 4, FIG. 10; Equation 1, FIG. 21). These control signals cause the mantissa control circuit 17 (FIG. 1) to shift the mantissa of the number stored in the B register 12 to the right a digit at a time storing zero digits in the B13 digit position and cause the exponent control circuit 16 to increase the value of the exponent stored in the section $E_b$ one unit for each digit shift of the mantissa while the X shift gating circuit 82 (FIG. 2) shifts the content of the X register 28 to the right one digit for each digit stored in the X register 28.

Initially, before the number stored in the B register 12 is scaled the timing flip-flop Q04FF is in a false state, and assuming an internal subtract operation is to take place, the gating circuit 90 (FIG. 3) applies a control signal at the I SUB output circuit. Therefore, as the number in the B register 12 is scaled, a control signal is applied at the $$B1 \xrightarrow{8c} X1$$

output circuit of the $B \rightarrow X$ gate control circuit 72 (see Equation 1, FIG. 15). The control signal at the $$B1 \xrightarrow{8c} X$$

causes the gating circuit 66 (FIG. 2) to store the eights complement of the digit stored in the B1 section of the B register 12 into the X1 section of the X register 28.

Assume that the J register 84 is still in state two and that the exponent in the A register 10 is still larger than that in the B register 12, causing a control signal to still be applied at the output circuit $E_a > E_b$ of the compare circuit 48 (FIG. 2). Also assume that the number stored in the B register 12 is scaled such that a non-zero digit is stored in the least significant digit position B1, therefore ready to be shifted out of the register, causing the decoding circuit 45 (FIG. 2) to apply a control signal at the $B1 \neq 0$ output circuit. These conditions cause the gating circuit 105 (FIG. 3) to apply a control signal at the SET=1 input circuit of the Q04FF flip-flop (see Equation 2, FIG. 20), causing the flip-flop to be set into a true state. Thus, the true state of the Q04FF flip-flop indicates a non-zero digit has been shifted out of the register in which a number is being scaled.

After the first non-zero digit is shifted out of the B register 12, and the Q04FF flip-flop is in a true state, while the number in the B register 12 is still being scaled, a control signal is applied at the $$B1 \xrightarrow{7c} X1$$

output circuit of the $B \rightarrow X$ gate control circuit 72 (see FIG. 2 and Equation 2, FIG. 15). The control signal at the $$B1 \xrightarrow{7c} X$$

output circuit causes the gating circuit 68 (FIG. 2) to store the sevens complement of the digit stored in section B1 into the X1 section of the X register 28. The scaling operation continues until either the exponents are made equal and a control signal is applied at the $E_a = E_b$ output circuit of the compare circuit 48 or the mantissa is sealed out of the B register 12 and a control signal is applied at the $B=0$ output circuit of the decoder 42.

Assuming an internal add is to take place rather than an internal subtract, the gating circuit 90 (FIG. 3) applies a control signal at the I ADD output circuit. This causes the $B \rightarrow X$ gate control circuit 72 (see Equation 3, FIG. 15) to apply a control signal at the $B1 \rightarrow X1$ output circuit. The control signal in the $B1 \rightarrow X1$ output circuit causes the gating circuit 70 to store the uncomplemented digit contained in section B1 into the X1 position of the X register 28. Thus, during internal add, alignment takes place identical to alignment during internal subtract except that the digits scaled out of a register are stored uncomplemented into the X register 28.

Figure 23:
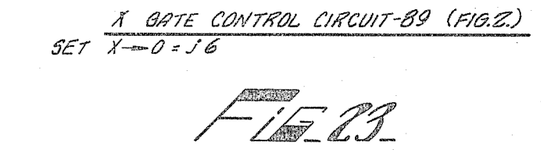
FIG. 23 shows a logical equation for the X gate control circuit 89 shown in FIG. 3.

The alignment operation for the condition when the exponent of the number stored in the B register 12 is larger than the exponent of the number stored in the A register 10 is similar to that described above wherein the exponent in the A register 10 is the larger except that the number stored in the B register is normalized and the number stored in the A register 10 is scaled. The operation for such a condition may be understood with reference to the flow diagram at the middle of FIG. 23A and with reference to the above discussion of the alignment operation.

At the right-hand side of FIG. 25A are two blocks of the flow diagram illustrating the subsequent operation of the adding and subtracting unit of FIG. 1 if during the alignment operation the mantissa of the number being scaled is shifted out of the corresponding register.

Assuming the exponent stored in the A register 10 is the larger, the compare circuit 48 (FIG. 2) applies a control signal at the $E_a > E_b$ output circuit, and assuming that the mantissa stored in the B register 12 has been scaled out of the register, the decoding circuit 43 (FIG. 2) applies a control signal at the $B=0$ output circuit. These conditions cause the control signals to be applied at the $E_a \rightarrow E_b$ output circuit and the SET=0 input of the Q04FF flip-flop (see FIG. 3; Equation, FIG. 8, and Equation 1, FIG. 20). These control signals cause the transfer circuit 86 (FIG. 3) to store the exponent contained in the section $E_a$ of the A register 10 into the B register 12 and if the Q04FF flip-flop is in a true state causes the gating circuit 106 to reset the Q04FF flip-flop into a false state.

The reason that the exponent contained in the A register 10 is stored in the B register 12 is that when the mantissa contained in the B register 12 is shifted out of the register, the result of the addition or subtraction operation is the number contained in the A register 10. Therefore, the exponent and mantissa must be transferred to the B register 12 where all results are stored. The mantissa is transferred during the combine operation. Another reason that the exponent contained in the A register 10 is stored in the B register 12 is that the subsequent operation of the adding and subtracting unit of FIG. 2 requires that the exponents be made equal.

The operation of the adding and subtracting unit of FIG. 2 after the mantissa of the number stored in the A register 10 is scaled out of the register is similar to that wherein the mantissa of the number stored in the B register 12 is scaled out of the register except that the exponent contained in the B register 12 is transferred to the A register 10 by the transfer circuit 88 under control of the $E_b \rightarrow E_a$ gate control circuit 88a (FIG. 3). This operation may be understood with reference to the lower block at the right-hand side of FIG. 25A and the equations of FIGS. 9 and 20.

*Complement operation*

Figure 17:
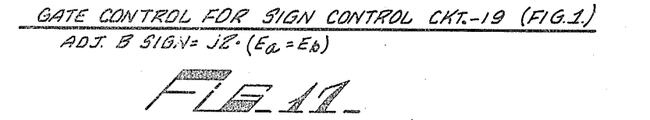
FIG. 17 shows the logical equation of the gating circuit of the timing generator for controlling the operation of the B sign control circuit shown in FIG. 1.

Refer now to the upper left-hand group of blocks of the flow diagram shown in FIG. 25B. After the two numbers are aligned with the exponents contained in the A register 10 and the B register 12 adjusted to equality, the compare circuit 48 (FIG. 2) applies a control signal at the output circuit $E_a = E_b$. Also the J register 84 (FIG. 3) is still in state two and a control signal is applied at the output circuit j2. These conditions cause the J register control circuit 84a to apply a control signal at the SET $J=3$ output circuit (see Equation 3, FIG. 4). These conditions also cause a control signal to be applied to the ADJ B SIGN circuit connected to the sign control circuit 19 (FIG. 1). The logical equation of the gating circuit in the timing generator 22 for providing the control signal to the ADJ B SIGN circuit is shown in FIG. 17.

Figure 6:
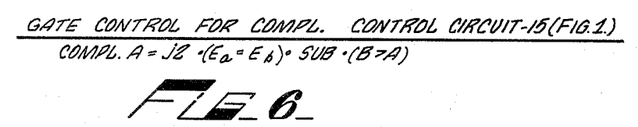
FIG. 6 shows the logical equation for the gating circuit of the timing generator for controlling the operation of the A complement control circuit shown in FIG. 1.

If during the complement operation an internal subtract operation is to take place and the mantissa contained in the A register 10 is smaller than that contained in the B register 12, the mantissa contained in the A register 10 must be complemented and added to the mantissa contained in the B register 12. Under these conditions the gating circuit 90 (FIG. 3) applies a control signal at the I SUB output circuit (see table of FIG. 24) and the compare circuit 46 applies a control circuit at the $B > A$ output circuit. These conditions cause a control signal to be applied at the COMP A circuit connected to the complement control circuit 15 (see FIG. 1 and equation, FIG. 6). Also if the Q04FF flip-flop is in a false state and a control signal is applied at the Q04F' output circuit (FIG. 3) a control signal is applied at the SET=1 input of the Q01FF flip-flop (see Equation 2, FIG. 18). Since the Q04FF flip-flop is now in a false state only if a non-zero digit has not been scaled out of a register, the true state of the Q01FF flip-flop now indicates that no non-zero digits have been scaled out of the register having the number being scaled. This condition is necessary during the combining operation.

With control signals applied at the output circuits $J=3$, ADJ B SIGN, COMP A and SET=1 of Q01FF flip-flop, the J register 84 (FIG. 3) is set into state three, the complement control circuit 15 (FIG. 1) forms the sevens complement of each of the digits contained in the A register 10 and the Q01FF flip-flop is set into a true state. When the J register 84 is set into state three, the complement operation is terminated and the combine operation is commenced.

*Combine operation*

Refer now to the lower left-hand group of blocks of the flow diagram of FIG. 25B.

During state three of the J register 84, the combine operation takes place in the adding and subtracting unit of FIG. 1. The combine operation takes place by means of the adding circuit 32 (FIG. 1) which adds the mantissas contained in the A and B registers 10 and 12 and stores the result into the mantissa section of the B register 12.

As explained hereinabove the Q01FF flip-flop is normally in a false state but is set into a true state during the complement operation if no non-zero digits have been scaled out of the register in which a number is being scaled. The radix complement of the smaller number is taken and combined with the uncomplemented form of the other number when performing subtraction. The radix complement of the number is formed by the adding and subtracting unit of FIG. 1 by forming the radix minus one complement (sevens complement) of each of the digits of the smaller number and then adding one unit to the least significant digit of the number. If non-zero digits have been scaled out of the register in which a number is being scaled, the least significant digit to which one unit is to be added is stored in the X register 28 or even shifted out of the X register 28 and under such a condition the Q01FF flip-flop is in a false state. If no non-zero digits have been shifted out of the register in which a number is being scaled, one unit is to be added to the complemented mantissa digits still stored in the A or B registers 10 and 12. Under such a condition the Q01FF flip-flop is in a true state.

Thus, during state three of the J register 84 a control signal is applied to the $A+B+Q01F \rightarrow B$ input of the adding circuit 32 (see equation, FIG. 13). Also control signals are applied at the $A \rightarrow 0$ input circuit of the mantissa control circuit 14 (see Equation 3, FIG. 5) and the SET=0 input of the flip-flop Q01FF (see FIG. 3 and Equation 1, FIG. 18). These conditions cause the adding circuit 32 to combine the complemented and uncomplemented mantissa digits stored in the A and B registers 10 and 12 adding one unit only if the Q01FF flip-flop is in a true state and causing the result to be stored into the B register 12. These conditions also cause the content of the mantissa section of the A register 10 to be cleared or set to all zeros, and the Q01FF flip-flop to be set into a false state.

If during state three of the J register 84 an internal subtract operation is taking place by the adding and subtracting unit of FIG. 1 and a control signal is applied at the I SUB output circuit of the gating circuit 9 (FIG. 3), a control signal is applied at the SET $J=4$ input of the J register 84 by the J register control circuit 84a (see Equation 4, FIG. 4). Thus, the J register 84 is set into state four wherein the adding and subtracting unit of FIG. 1 normalizes the result contained in the B register 12.

If during state three of the J register 84 an internal add operation is taking place by the adding and subtracting unit of FIG. 1 and a control signal is being applied at the I ADD output circuit of the gating circuit 90, a control signal is applied at the SET $J=5$ input circuit of the J register 84 by the J register control circuit 84a (see Equation 5, FIG. 4).

Also, if an internal add operation is taking place and there is a carry-out from the B register 12 in the result, a control signal is applied at the $C_a$ output of the adding circuit 32 causing a control signal to be applied at the SET=1 input of the Q03FF flip-flop (see Equation 2, FIG. 19).

Thus, if an internal add is taking place, the J register 84 is set into state five where the result is scaled and adjusted for overflow (or carry-out) and the Q03FF flip-flop is set into a true state thereby indicating, during the scale result operation, that there has been a carry-out from the B register 12 in the result and the result must be scaled.

Normalize result operation

Refer now to the upper group of blocks at the middle of the flow diagram of FIG. 25B. During the normalize result operation of the adding and subtracting unit of FIG. 1, the J register 84 is in state four.

As described above, if upon entering the normalize operation, the Q04FF flip-flop is in a false state, the condition of the flip-flop indicates that no non-zero digits have been shifted out of the register in which a number was being scaled. Under these conditions, a control signal is applied at the SET $J=6$ input of the J register 84 by the J register control circuit 84a (see Equation 6, FIG. 4) and the J register 84 is set into state six. However, if the Q04FF flip-flop is in a true state, the state of the flip-flop indicates that a non-zero digit was shifted out of the register in which a number was scaled. Therefore, if the Q04FF flip-flop is in a true state indicating a digit has been scaled out that can be shifted back into the result and there is a zero leading digit in the result contained in the B register, the result may be normalized and the complemented digit contained in the X1 section of the X register 28 may be shifted back into the B register 12.

With control signals at the $f4$ output circuit, the Q04F output circuit, and the $B13=0$ output circuit of the decoding circuit 40 (FIG. 2), control signals are applied at the $E_b-1$ input circuit of the exponent control circuit 16 (see Equation 1, FIG. 12) the SHIFT BL. input circuit of the mantissa control circuit 17 (see FIG. 1 and the Equation 1, FIG. 10), the $X \rightarrow R$ input circuit of the shift gating circuit 83 (see FIG. 2 and the Equation 1, FIG. 21), and the $X1 \rightarrow B1$ input circuit of the gating circuit 28 (see FIG. 2 and the equation, FIG. 22). Also the gating circuit 106 (FIG. 3) applies a control signal at the SET=0 input of the Q04FF flip-flop (see Equation 1, FIG. 20). Thus, the mantissa control circuit 17 (FIG. 1) shifts the mantissa of the result contained in the B register 12 one digit position to the left, the exponent control circuit 16 (FIG. 1) decreases the value of the exponent contained in the B register 12 by one unit, the X shift control circuit 82 causes the shift gating circuit 83 to shift the contents of the X register 28 one digit position to the left, the gating circuit 78 stores the digit contained in section X1 of the X register 28 into the B1 section of the B register 12, and the gating circuit 106 sets the Q04FF flip-flop into a false state.

To be explained in detail subsequently, during state six of the J register 84 the result stored in the B register 12 is rounded off depending on the digit stored in the X register 28 next to the last one shifted out of the register in which a number is scaled. After the content of the X register 28 is shifted to the left one digit, the digit stored in the X register 28 next to the last one shifted out of the register in which a number is being scaled is stored in section X1. If a digit contained in section X1 of the X register 28 is equal to or greater than four, one unit is added to the result contained in the B register 12. The Q01FF flip-flop is used during state six in order to provide an indication of whether the digit contained in section X1 of the X register 28 is equal to or greater than 4. To this end, a control signal is applied at the SET=1 input of the Q01FF flip-flop (FIG. 3) by the gating circuit 101 (see Equation 2, FIG. 18) whenever the decoding circuit 74 (FIG. 2) applies a control signal at the output circuit $X1 \geq 4$ and the J register 84 is in state four and the Q04FF flip-flop is in a false state. As explained hereinabove, a false state of Q04FF flip-flop during state four of the J register 84 causes a control signal at the SET $J=6$ input of the J register 84. Therefore, the J register is set into state six and the Q01FF flip-flop is set into a true state.

Scale result operation

In connection with the description of the combine operation, it was pointed out that if an internal add operation takes place in the adding and subtracting unit of FIG. 1, the J register is set from state three into state five. Refer now to the lower group of blocks at the middle of the flow diagram of FIG. 25B. These blocks illustrate the sequence of operation of the system of FIG. 1 for a scale result operation.

The operation of the adding and subtracting unit of FIG. 1 for a scale result operation is quite similar to that for a normalize result operation except that if the Q03FF flip-flop is in a true state indicating that a carry-out or overflow occurred from the result stored in the mantissa section of the B register 12 during the combining operation, the mantissa contained in the B register 12 is shifted to the right one digit position and the exponent of the number increased one unit. Concurrently with the scaling of the result, an octal digit one is stored in the most significant digit section B13, of the B register 12. After the result has been scaled, the Q01FF flip-flop is set into a true state if the digit contained in the X1 section of the X register 28 is equal to or greater than four for use in rounding off the result during the round-off operation. Also, the J register 84 is set into state six where the round-off operation takes place.

Round-off operation

Refer now to the upper right-hand group of blocks in the flow diagram of FIG. 25B which illustrate the round-off operation of the adding and subtracting unit of FIG. 1. During state six of the J register 84, a control signal is applied at the $B+A+Q01F \rightarrow B$ input of the adding circuit 32 by the timing generator 22 (see equation, FIG. 13). It will be noted that during the combine operation, the content of the mantissa section of the A register 10 was cleared and now contains all zero digits. It will also be noted that in connection with the description of the normalize result operation and scale result operation, the Q01FF flip-flop is set into a true state if a round-off of the last significant digit of the result is to take place. To this end, the adding circuit 32 is responsive to the control signal applied at the $A+B+Q01F \rightarrow B$ input circuit thereof for combining the result contained in the B register 12 with the content of the A register 10 (which contains all zeros) and adds thereto one unit if the Q01FF flip-flop is in a true state. The result is then stored back into the B register 12.

Also control signals are applied at the SET $J=0$ input of the J register 84 by the J register control circuit 84a (see Equation 1, FIG. 4), and to the SET $X \rightarrow 0$ input circuit of the gating circuit 87 by the X gate control circuit 89 (see FIG. 2 and the equation, FIG. 22). Therefore, the J register 84 is set into state zero and zero digits are stored in the X register 28.

With the J register 84 set into state zero, the adding and subtracting unit of FIG. 1 is recycled into its initial state of operation and a new order is provided by the source of order signals 24 and new operands are stored in the A register 10 and B register 12 by the source of operands 26.

What is claimed is:

1. In a digital computer arithmetic unit arranged for electrically subtracting one floating point number represented by mantissa digits and an exponent from another number by electrically aligning the numbers by shifting the mantissa of the number having the larger exponent in the direction of the most significant digit and electrically shifting the mantissa of the number with the smaller exponent in the direction of the least significant digit in the registers in which they are stored until the mantissas are aligned, electrically complementing the smaller mantissa and combining the complemented and uncomplemented mantissas to form a result corresponding to the difference between the two original numbers and storing the result in a register, the improvement comprising:

(a) means for electrically complementing the last digit of the number with the smaller exponent which is shifted out of the register in which it is stored;

(b) means for storing the digit formed by the complementing means;

(c) means for selectively and electrically shifting the result in the register in which it is stored one digit position in the direction of the most significant digit if there is at least one leading zero digit in the result; and (d) means for electrically shifting said stored digit into the register in which the result is stored concurrently with the shifting of the result for increasing the accuracy of such result.

2. In a digital computer arithmetic unit arranged for electrically subtracting one floating point number represented by mantissa digits and an exponent from another number by electrically aligning the numbers by shifting the mantissa of the number having the larger exponent in the direction of the most sigificant digit and electrically shifting the mantissa of the number with the smaller exponent in the direction of the least significant digit in the registers in which they are stored until the mantissas are aligned, electrically complementing the smaller mantissa and combining the complemented and uncomplemented mantissas to form a result corresponding to the difference between the two original numbers and storing the result in a register, the improvement comprising:

(a) means for electrically forming the radix complement of the first non-zero digit and for forming the radix minus one complement of the subsequent digits of the number with the smaller exponent which are shifted out of the register in which they are stored;

(b) a register for storing at least the last two digits formed by the complementing means before the mantissas are aligned;

(c) means for selectively and electrically shifting the result in the register in which it is stored one digit position in the direction of the most significant digit if there is at least one leading zero digit in the result;

(d) means for electrically shifting the most significant one of said at least two stored digits into the register in which the result is stored concurrently with the shifting of the result;

(e) electrical circuit means for detecting the value of the next most significant one of said at least two stored digits and for forming an electrical signal corresponding thereto; and (f) means responsive to the electrical signal for selectively adding one unit to the result digits stored in the register in which the result is stored depending on the value of such next most significant digit for increasing the accuracy of such result.

3. In a digital computer arithmetic unit arranged for electrically subtracting one floating point number represented by mantissa digits and an exponent from another number by electrically aligning the numbers by shifting the mantissa of the number having the larger exponent in the direction of the most significant digit and electrically shifting the mantissa of the number with the smaller exponent in the direction of the least significant digit in the registers in which they are stored until the mantissas are aligned, electrically complementing the smaller mantissa and combining the complemented and uncomplemented mantissas to form a result corresponding to the difference between the two original numbers and storing the result in a register, the improvement comprising:

(a) means for electrically complementing the digits of the number with the smaller exponent which digits are shifted out of the register in which they are stored;

(b) a register for storing at least the last two digits formed by the complementing means before the mantissas are aligned;

(c) means for selectively and electrically shifting the result in the register in which it is stored one digit position in the direction of the most significant digit if there is at least one leading zero digit in the result;

(d) means for electrically shifting the most significant one of the at least two stored digits into the register in which the result is stored concurrently with the shifting of the result; and (e) means responsive to the next to the most significant one of the at least two stored digits for rounding off the result depending on the value of such digit for increasing the accuracy of such result.

4. In an arithmetic unit for a digital computer for electrically aligning and subtracting first and second floating point numbers each of which is represented by an exponent signal stored in a register and mantissa digits stored in a register, the first number having the smaller exponent, including electrical circuits for aligning the numbers by first shifting the mantissa signals of the second number in the direction of the most significant digit and adjusting the associated exponent corresponding thereto until there are no leading zero digits in the corresponding mantissa storage register and subsequently shifting the mantissa of the first number in the direction of the least significant digit and adjusting the associated exponent corresponding thereto until the two exponents are equal, the improvement comprising:

(a) electrical circuit means for selectively forming the radix complement of each stored mantissa digit of the stored first number after the exponents are adjusted to equality;

(b) an adding circuit for combining the complemented and uncomplemented digits together and for forming a binary-coded-digit result mantissa representing the difference between the two original numbers;

(c) electrical circuit means for forming the radix complement of the first non-zero digit and the radix minus one complement of each subsequent digit of any mantissa digits of the first number shifted past the least significant digit end of the corresponding mantissa register;

(d) a two digit storage register for separately storing the last two digits shifted past the least significant digit end of the corresponding register and complemented as the exponents are adjusted to equality;

(e) electrical circuit means for storing the result mantissa into one of the mantissa registers and concurrently shifting the result digits one digit position in the direction of the most significant digit if the result contains at least one leading zero digit;

(f) electrical circuit means for adjusting the exponent signal stored in the corresponding exponent register according to the one digit shift;

(g) means for shifting the most significant one of the two separately stored and complemented digits into the least significant end of the mantissa register storing the result digits concurrently with the shifting of the result signals; and (h) means for rounding off the stored result digits depending on the value of the last significant one of the two separately stored and complemented digits for increasing the accuracy of the result.

5. In an arithmetic unit for a digital computer for electrically aligning and subtracting first and second floating point numbers each of which is represented by exponent signals stored in a register and mantissa digits stored in a register, the first number having the smaller exponent, including electrical circuits for aligning the numbers by first shifting the mantissa digits of the second number in the direction of the most significant digit and adjusting the associated exponent corresponding thereto until there are no leading zero digits in the corresponding mantissa storage register and subsequently shifting the mantissa of the first number in the direction of the least significant digit and adjusting the associated exponent corresponding thereto until the two exponents are equal, the improvement comprising:
 (a) means for selectively forming the radix complement of each stored mantissa digit of the stored first number after the exponents are adjusted to equality;
 (b) means for combining the complemented and uncomplemented digits together and for forming a binary-coded-digit result mantissa representing the difference between the two original numbers;
 (c) means for forming the radix complement of the first non-zero digit and the radix minus one complement of each subsequent digit of any mantissa digits of the first number shifted past the least significant digit end of the corresponding mantissa register;
 (d) means for separately storing the last digit shifted past the least significant digit end of the corresponding register and complemented as the exponents are adjusted to equality;
 (e) means for storing the result mantissa into one of the mantissa registers and concurrently shifting the result digits one digit position in the direction of the most significant digit if the result contains at least one leading zero digit;
 (f) means for electrically adjusting the exponent signal stored in the corresponding exponent register according to the one digit shift; and
 (g) means for shifting the separately stored and complemented digit into the least significant digit end of the mantissa register storing the result digits concurrently with the shifting of the result for thereby increasing the accuracy of the result.

6. In a digital computer arithmetic unit arranged for electrically subtracting two floating point numbers, the combination comprising:
 (a) alignment register means having mantissa and exponent storage registers for storing a mantissa and an exponent for each of two floating point numbers which are to be combined together, the mantissa signals of each number being composed of binary-coded-digit signals, and including electrical circuits for selectively shifting the mantissas of the two numbers and correspondingly adjusting the exponents until the two mantissas are aligned with the exponents equal and the most significant digit of the mantissa of the number having the larger exponent is positioned at the most significant position in the register in which it is stored;
 (b) means for forming the radix complement of the first non-zero digit and the radix minus one complement of each subsequent digit of any mantissa digits of the smaller exponent number shifted past the least significant digit end of the corresponding register including means for separately storing the last digit shifted past the least significant digit end and complemented as the exponents of the numbers are adjusted to equality;
 (c) means for selectively forming the radix minus one complement of each of the stored mantissa digits of the smaller exponent number remaining in the corresponding mantissa register after the exponents are adjusted to equality;
 (d) means for electrically combining the complemented and uncomplemented digit signals stored in the mantissa registers and for forming a result mantissa composed of binary-coded-digit signals corresponding to the difference of the two original mantissas including means for storing the result digits back into one of the same two mantissa registers as the original mantissas are stored; and means for selectively shifting the result digits one digit position in the direction of the most significant digit thereof and for concurrently shifting the separately stored digit back into the same mantissa register and for electrically adjusting the corresponding stored exponent signal corresponding to such shift if there is a leading zero digit in the result for increasing the accuracy of the result.

7. In a digital computer arithmetic unit arranged for electrically subtracting two floating point numbers, the combination comprising:
 (a) alignment register means having mantissa and exponent storage registers for storing a mantissa and an exponent for each of two floating point numbers which are to be combined together, the mantissa signals of each number being composed of binary-coded-digit signals, and including electrical circuits for shifting the mantissas of the two numbers and correspondingly adjusting the exponents until the two mantissa digits are aligned with the exponents equal and the most significant digit of the mantissa of the number having the larger exponent is positioned at the most significant position in the register in which it is stored;
 (b) at least one electrical complementing circuit for forming the radix complement of the first non-zero digit and the radix minus one complement of each subsequent digit of any mantissa digits of the smaller exponent number shifted past the least significant digit end of the corresponding register;
 (c) a digit storage register for separately storing the last digit shifted past the least significant digit end and complemented as the exponents of the numbers are adjusted to equality;
 (d) an electrical complementing circuit for forming the radix minus one complement of each of the stored mantissa digits of the smaller exponent number remaining in the corresponding mantissa register after the exponents are adjusted to equality;
 (e) an adding circuit for electrically combining the complemented and uncomplemented digit signals stored in the mantissa registers and for forming a result mantissa composed of binary-coded-digit signals corresponding to the difference of the two original mantissas, including electrical circuit means for storing the result digits back into one of the same two mantissa registers as the orignal mantissas are stored; and
 (f) means for selectively shifting the result digits one digit position in the direction of the most significant digit thereof and for concurrently shifting the separately stored digit back into the same mantissa register and for electrically adjusting the corresponding stored exponent signal corresponding to such shift if there is a leading zero digit in the result for increasing the accuracy of the result.

8. In a digital computer arithmetic unit arranged for electrically subtracting two floating point numbers, the combination comprising:
 (a) alignment register means having mantissa and exponent storage registers for storing a mantissa and an exponent for each of two floating point numbers which are to be combined together, the mantissa signals of each number being composed of binary-coded-digit signals, and including electrical circuits for selectively shifting the mantissas of the two numbers and adjusting the exponents corresponding to the shifting until the mantissas digits are aligned with the exponents equal and the most significant digit of the mantissa of the number having the larger exponent is positioned at the most significant position in the register in which it is stored;
 (b) at least one electrical complementing circuit for forming the radix complement of the first non-zero digit and the radix minus one complement of each subsequent digit of any mantissa digits of the smaller exponent number shifted past the least significant digit end of the corresponding register;

(c) a two digit storage register for separately storing the last two digits shifted past the least significant digit end and complemented as the exponents of the numbers are adjusted to equality;

(d) an electrical complementing circuit for forming the radix minus one complement of each of the stored mantissa digits of the smaller exponent number remaining in the corresponding mantissa register after the exponents are adjusted to equality;

(e) an adding circuit for electrically combining the complemented and uncomplemented digit signals stored in the mantissa registers and for forming a result mantissa composed of binary-coded-digit signals corresponding to the difference of the two original mantissas, including electrical circuit means for storing the result digits back into one of the same two mantissa registers as the original mantissas are stored;

(f) means for selectively shifting the result digits one digit position in the direction of the most significant digit thereof in the mantissa register in which it is stored and for concurrently shifting the most significant one of the two stored digits back into the same mantissa register and for electrically adjusting the corresponding stored exponent signal corresponding to such shift if there is a leading zero digit in the result; and (g) an electrical circuit for rounding off the result digits depending on the value of the least significant one of the two stored digits for increasing the accuracy of the result.

No references cited.

ROBERT C. BAILEY, *Primary Examiner.*